INVENTORS
ROY E. THOMPSON
JURD M. YOUNG
BY Ely Silverman
ATTORNEY

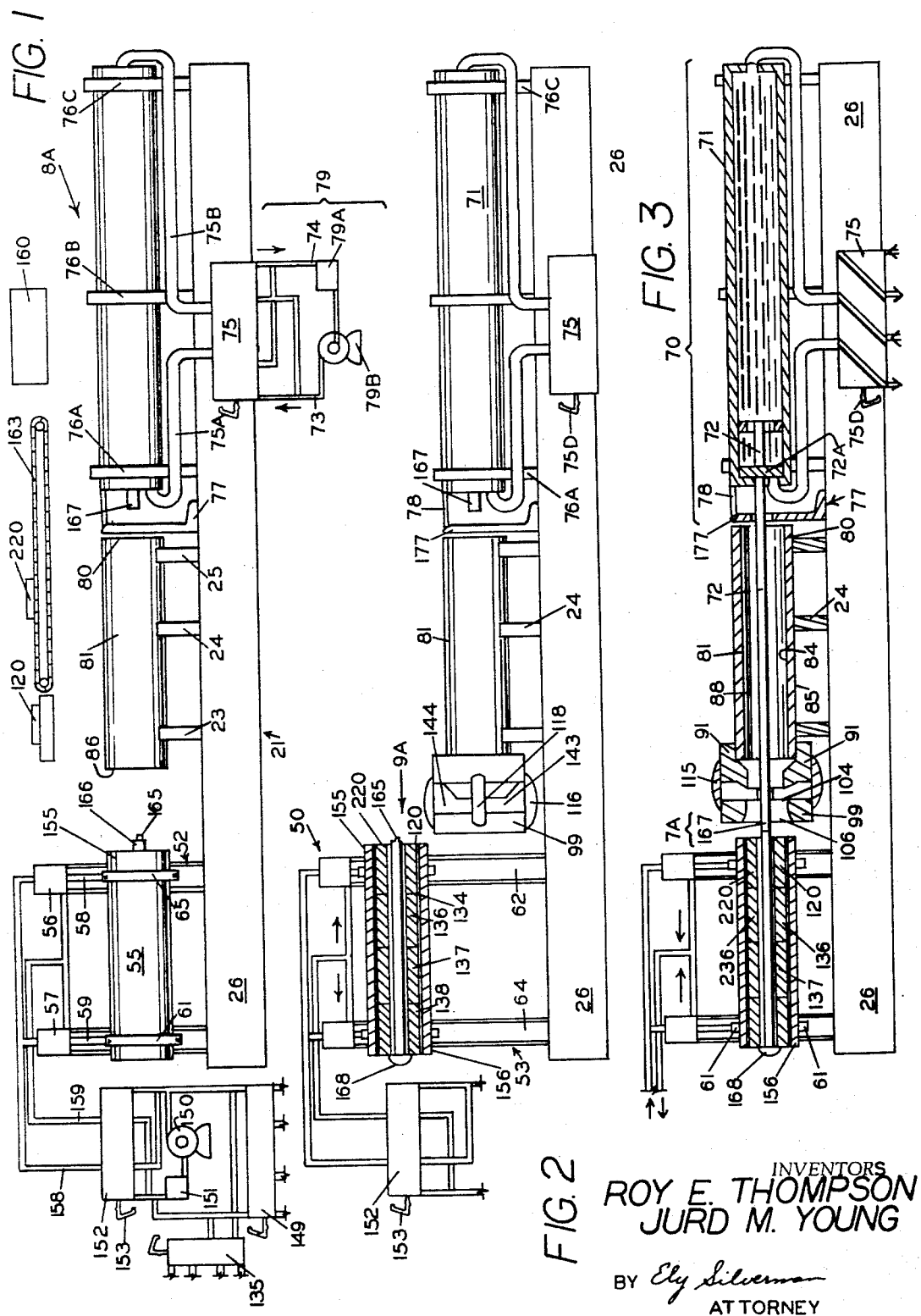

INVENTORS
ROY E. THOMPSON
JURD M. YOUNG

BY Ely Silverman
ATTORNEY

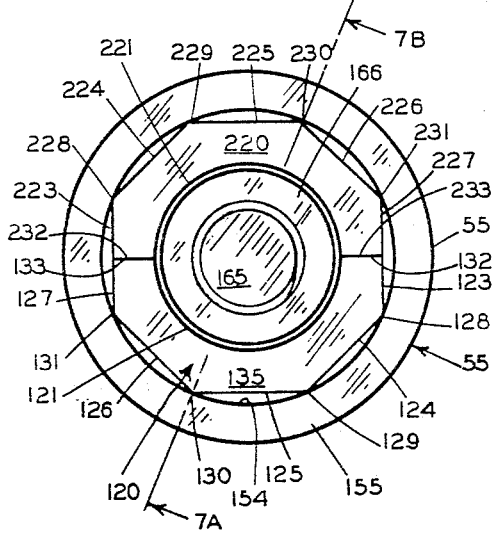
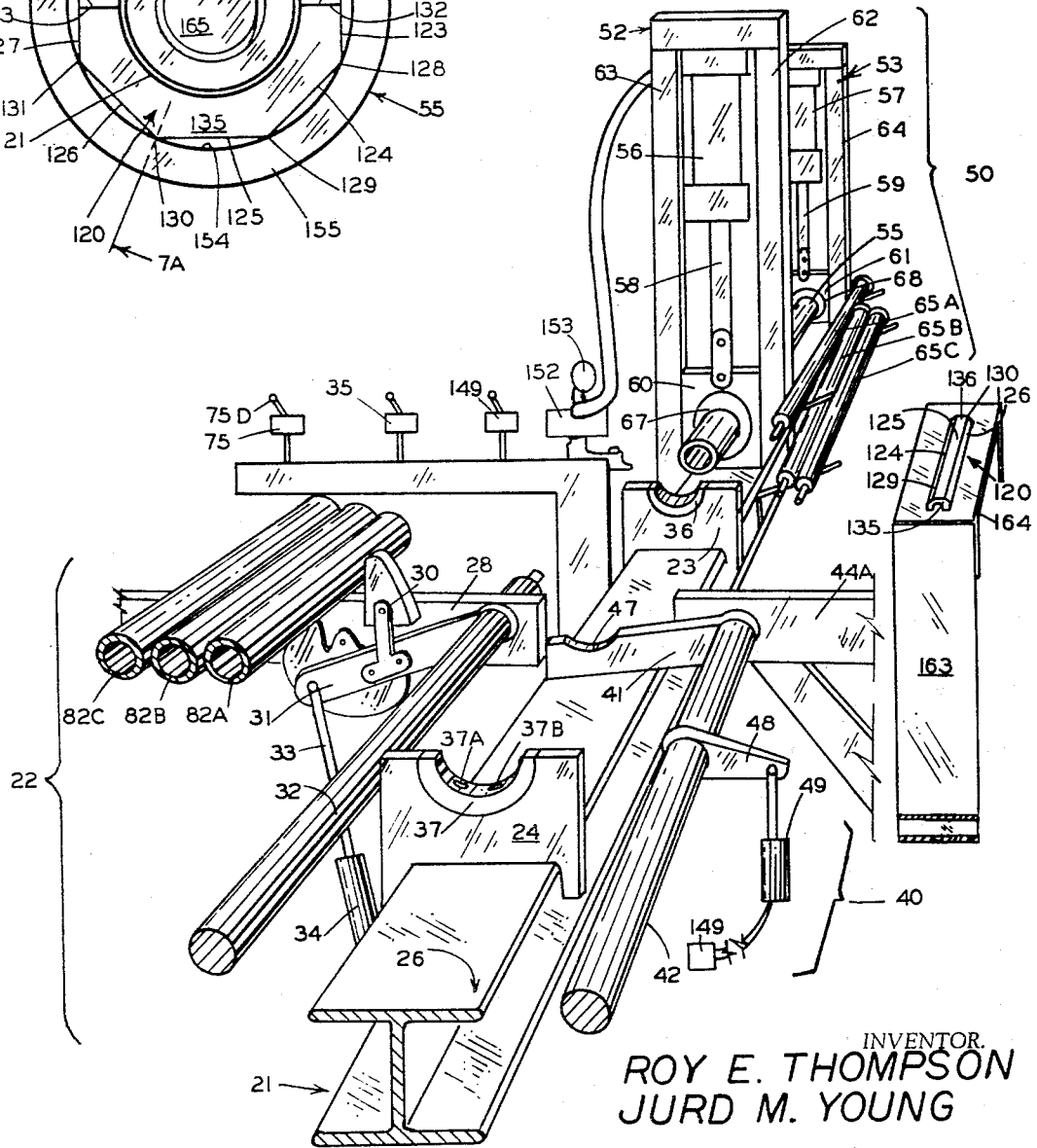

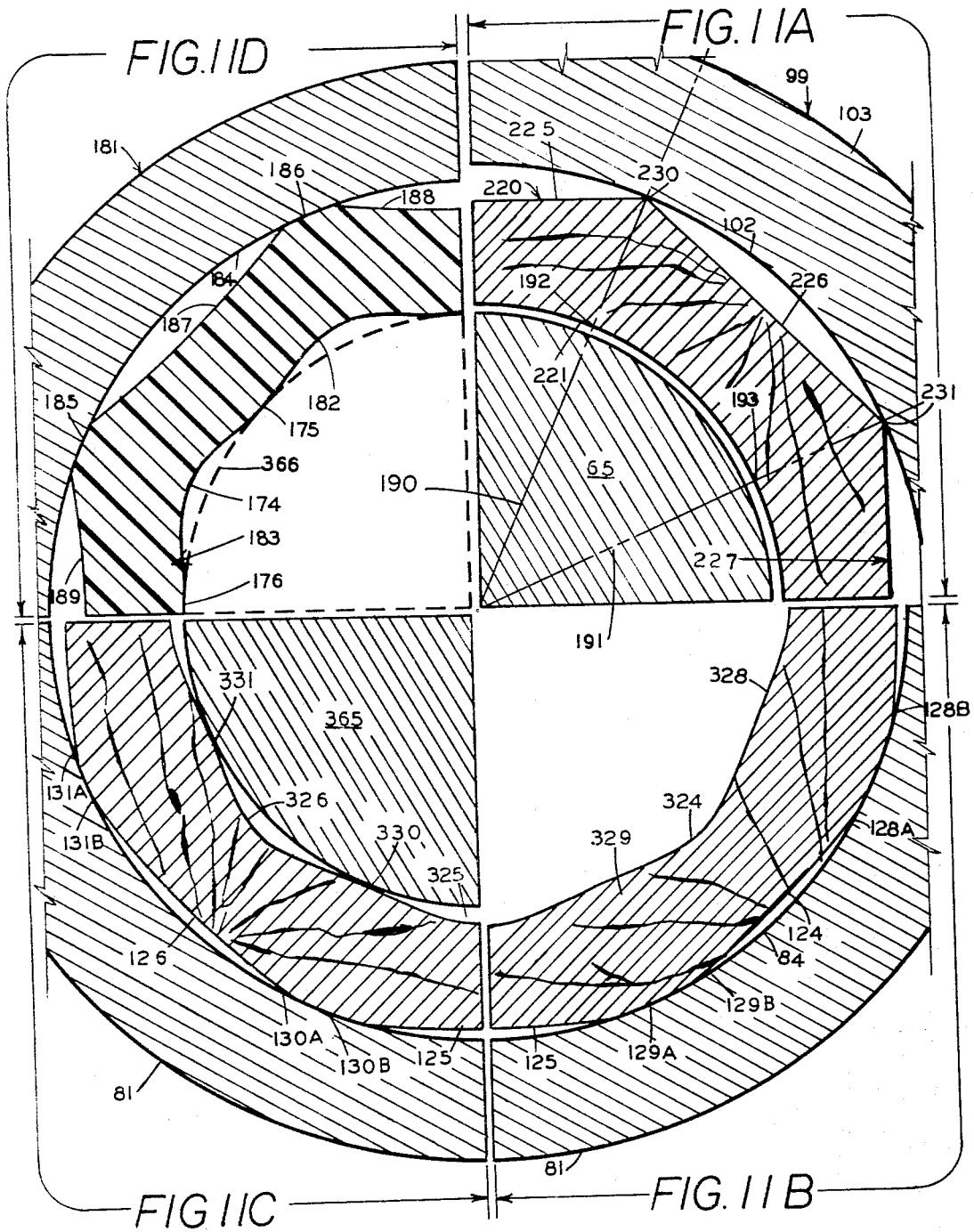

3,421,197
Patented Jan. 14, 1969

3,421,197
LONG WOOD LINED BEARING AND PROCESS AND APPARATUS FOR ITS MANUFACTURE
Roy E. Thompson and Jurd M. Young, Lubbock, Tex., assignors to Roy E. Thompson, Lubbock, Tex.
Filed Sept. 18, 1967, Ser. No. 668,544
U.S. Cl. 29—149.5                11 Claims
Int. Cl. B21d 53/10; B23p 19/00

ABSTRACT OF THE DISCLOSURE

A combination of pipe feeding and discharging assemblies and wooden liner alignment and cutting and compressing and drawing assemblies and process of operation and control thereof provides for rapidly and reliably inserting substantial lengths of oil-impregnated wooden liner elements into steel pipes.

The product of the operation is a stable long oil-impregnated wood-lined bearing with an improved smooth mildly undulated interior bearing surface.

BACKGROUND OF THE INVENTION

Field of the invention

An apparatus and method of its operation for locating, forming, moving and assembling a plurality of elongated wooden oil-impregnated liner and sleeve elements to form oil-impregnated wood-lined bearings and the product, an improved long wood-lined bearing.

Description of the prior art

While wooden bearings are especially useful for water wells because of their ability to operate notwithstanding the usual accumulation of sand in such wells, which sand damages and makes ineffectual other bearing materials, wooden liners have been subject to the problem that, if they are placed loosely in the sleeve therefor, the vibration of the shaft therein during operation destroys them while, if the wooden bearings are attempted to be placed tightly in their sleeve, the usual procedure of placement of such wooden liners into sleeves therefor is difficult and results in breaking of such elements when the total length of such liner is longer than about four feet. Also, reaming out such wooden liners previously forcefully put into sleeves therefor by pushing such liners into such sleeves, results in irregularities and stress concentration in the reamed-out surface and renders such wood-lined bearings subject to stress concentration in their surfaces and bodies that may produce bending or aggravate the tendency of such liners to split. Accordingly, the length of stable wooden bearing liners has been limited.

SUMMARY OF THE INVENTION

A powered centrally located longitudinally movable control mandrel moves each of a long (18 feet) series of small, hollow, longitudinally extending, shaped and sized oil-impregnated wooden bearing elements longitudinally while maintaining the orientation thereof through a compressing and cutting operation into and in the sleeve or pipe in which it is to be located. Radial distortion and cutting and longitudinal movement of the liner to its final position are smoothly and evenly achieved sufficiently rapidly to be complete before the distortion of that liner material is relieved and serve to firmly locate the liner elements in final place in their sleeve with a smooth undulated interior bearing surface that provides improved reliability and efficiency in operation as a well bearing liner.

This invention has as one object thereof an apparatus for locating, forming, cutting, moving and assembling each of a plurality of elongated wooden shaped elements to rapidly, reliably and economically form an improved long wood-lined bearing unit. Another object of this invention is an improved process for forming wood-lined bearings. Another object of this invention is an improved stable wood-lined bearing. Another object of this invention is an improved stable plastic lined bearing.

BRIEF DESCRIPTION OF THE DRAWINGS

FIGURES 1, 2, 3, 4, 5 and 6 show successive stages in operation of the apparatus 20 in FIGURE 4 of this invention; FIGURE 1 is a diagrammatic side view showing the arrangement of apparatus 20 in a first stage of the operation of a cycle of the apparatus 20; FIGURE 2 is a diagrammatic side, partly in longitudinal vertical section, view through the raised and loaded alignment assembly 50, and a side view of the pipe 81 with the blade subassembly 90 in FIGURE 6 affixed thereto with the draw piston shaft 72 in its contracted position; FIGURE 3 is a diagrammatic central longitudinal vertical sectional view of apparatus 20 in a stage subsequent to the stage of operation of FIGURE 2 and shows the loaded carrier tube 55 and the liner components in position immediately prior to the longitudinal liner feed operation of the apparatus 20; FIGURE 4 is a diagrammatic longitudinal central vertical sectional view of elements of the apparatus 20 in a stage subsequent to that shown in FIGURE 3 and wherein the load of liner elements is in an early stage of its movement from the carrier tube 55 into contact with the blade assembly 90; FIGURE 5 is a diagrammatic longitudinal central vertical sectional view through apparatus 20 and shows the liner elements in place in a pipe 81; FIGURE 6 is a diagrammatic view as in FIGURE 3 and shows the piston shaft 72 in FIGURE 3 extended through the pipe 81 with the draw rod 65 in FIGURE 7 returned to its loading position and the bearing liner assembly located in final position in pipe 81.

FIGURES 1–8 are not to scale.

FIGURE 9 is a view of the liner elements 120 and 220 in place in carrier tube 55 as seen along the direction of arrow 9A of FIGURE 2, and is generally to scale.

FIGURE 10 is an enlarged view of zone 10A of FIGURE 8.

FIGURE 11A, FIGURE 11B, FIGURE 11C and FIGURE 11D are quadrants of four cross-sectional views each shown at the same greatly enlarged scale to diagrammatically illustrate the physically small features present in one stage of operation of the apparatus 20, the product of the process, the product during its operation, and another embodiment of product during its operation. FIGURE 11A diagrammatically shows the upper right quadrant of a transverse cross sectional view at section 11A—11A of FIGURE 7; FIGURE 11B shows a lower right quadrant of a transverse cross sectional view of a lined bearing as seen along the direction of arrow 11B of FIGURE 8 at section 11BB of FIGURE 8; the lined bearing shown is the pipe 81 of FIGURES 1–7 showing one of a plurality of hereinbelow discussed liner elements, as 120, therein; this portion of finished product is shown as it is seen when it is located in the position shown for pipe 83C. FIGURE 11C is the lower left quadrant of a sectional view transverse to the length of the central longitudinal axis of the lined bearing shown in FIGURE 11B during the operation thereof as a bearing in a well; FIGURE 11D is an upper left quadrant of a sectional view transverse to the length of the central longitudinal axis of another embodiment of lined bearing viewed as described for FIGURE 11B. FIGURES 11A–11D are diagrammatic and not to scale as they exaggerate some structural details to render some relations thereof more readily apparent.

Table I and II give dimensions of an operative embodiment 20, and of some variations therein, with reference to the reference numerals used in the drawings wherein the same reference numeral refers to the same referent throughout.

DESCRIPTION OF THE PREFERRED EMBODIMENT

Figure 4:
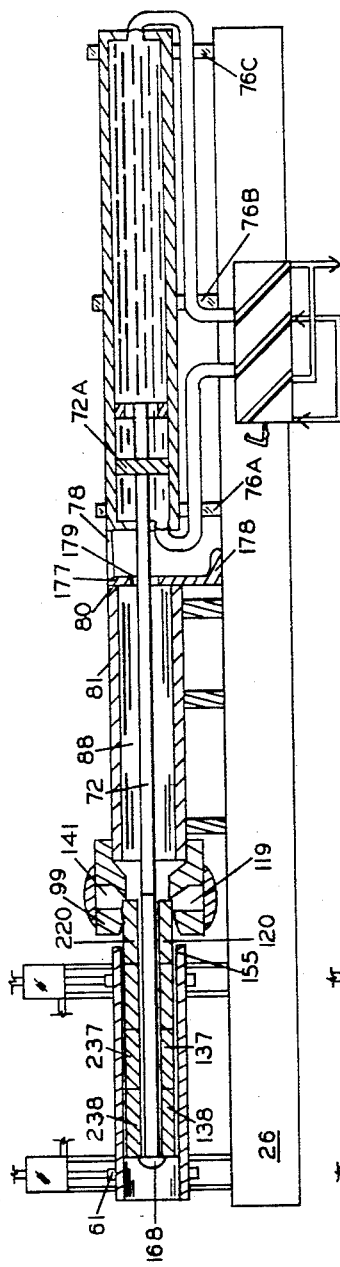

The apparatus, 20, of this invention comprises an empty pipe feeder assembly 22, a loaded lined pipe discharge sub-assembly 40, a liner alignment sub-assembly 50, a liner drawing assembly 70, and a pipe support and frame assembly 21.

The pipe support and frame assembly 21 comprises a central elongated steel rigid I-bean 26 which firmly supports a series of rigid journal supports 23, 24 and 25 on the upper surface of that beam. The bottom of each journal support 23, 24 and 25 is located on top of that beam and, in the upper pipe-bearing surfaces of each journal support, a replaceable semi-cylindrical open topped journal or bush is located with the central longitudinal axis of each bush coaxial and in line with the alignment assembly 50 and the liner draw assembly 70; journal support 23 is provided at its top with a semi-cylindrical bush 36; support 24 is also shown provided with a similar semi-cylindrical bush 37. Alignment assembly 50 and liner drawing assembly 70 are also firmly attached to and supported on the top of I-beam 26.

The empty pipe feed sub-assembly 22 comprises a pair of rigid, flat topped sloped parallel pipe feed rails 27 and 28 which feed the empty pipes as 82A, 82B, 82C to the journal supports 23, 24 and 25. Preparatory to insertion of liner elements as 120, 220, 137, 237, 138, 238 therein each of the empty rigid steel pipes as 82A, 82B, 82C is located on the rails 27 and 28 and stored there temporarily. The empty pipes as 82A, 82B, 82C are to serve as bearing sleeves in the finished wood lined bearing as 83A, 83B, 83C; such stored empty pipes are maintained on the sloped rails 27 and 28 by engagement with the vertically movable vertically extending latch arms 29 and 30. Latch arms 29 and 30 are rigid bars that extend vertically above the rails 27 and 28 respectively. Each latch arm, as 30, is supported in a vertically movable link as 31 shown for latch 30 in FIGURE 10. Each link, as 31 is supported on a rigid rotatably mounted pipe feeder control shaft 32. Shaft 32 is rotatably supported at one end on rail 28 and at the other end on rail 27. Shaft 32 is driven through links 33 and 31 by a motor 34 and control 35. Thereby the pipes 82A, 82B and 82C are separately moved to and come to rest on the co-axial bushings of supports 23, 24 and 25.

The loaded pipe discharge assembly 40 of apparatus 20 provides for the discharge of pipe 81 after it has been lined by elements as 120, 220, 137, 237, 138, 238 as herebelow described. The discharge assembly 40 comprises a pair of lifting arms 41 and 43, a loaded pipe discharge arm shaft 42, a pair of sloped pipe discharge rails 44 and 45 and a power source 49 therefor. The first lifting arm 41 and a second lifting arm 43 are each rigid and are each firmly fixed to a rotatable rigid pipe discharge arm control shaft 42. Each arm as 41 and 42 is provided with an upper cupped portion (47 for 41) to engage the pipe as 81 after it is lined and to remove same from its location on supports 23, 24 and 25.

Rails 44 and 45 are rigid rails with smooth tops. The feed or inner end of each of rail 44 and 45 (44A and 45A, respectively) is firmly located near to but spaced away from I-beam 26. The other, discharge, end of each rail (as 45B of rail 45), is located on the side of I-beam 26 opposite from that side thereof on which assembly 22 is located and at a level lower than that of the feed end. The tops of rails 44 and 45 are parallel to each other and sloped at a 5° angle to the horizontal. Shaft 42 is rotatably supported on the inner end of each of rails 44 and 45. The lifting arms 41 and 43 extend from shaft 42 towards assembly 20 on top of I-beam 26 and the cupped portions are, in one position thereof, located below and in line with the axes of the bushes of each of the supports 23, 24 and 25.

Rigid link 48 is attached to shaft 42 and is actuated by a hydraulic motor 49 which is controlled by a control therefor 149. Removal of pipe from supports 23, 24 and 25 is effected by actuating control 149 to activate piston 49 and applying force to the link 48 (which is attached to the shaft 42) and rotating shaft 42 and arms 41 and 42 clockwise and lifting the pipe in the cupped portions as 47 upward.

This action of the arms 41 and 42 thus causes the lined pipes such as 82A, 83B and 83C to roll down the downwardly sloped rails 44 and 45 and be stored at the end thereof distant from beam 26 until they are removed.

Figure 5:
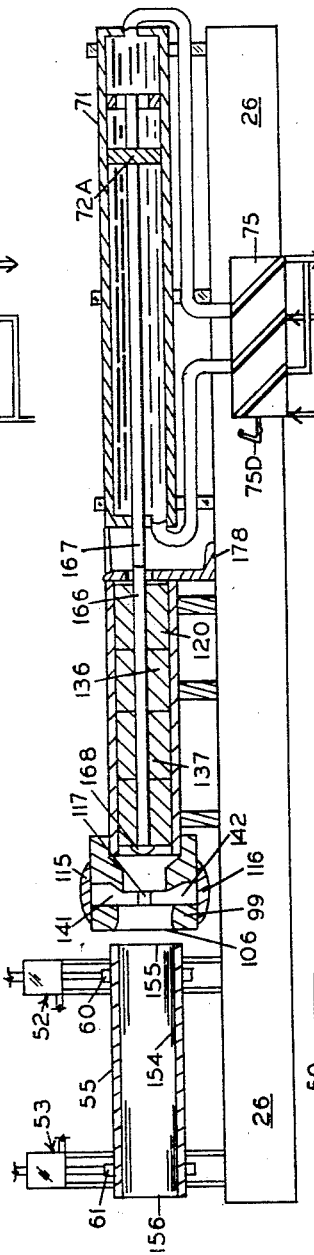
Figure 6:
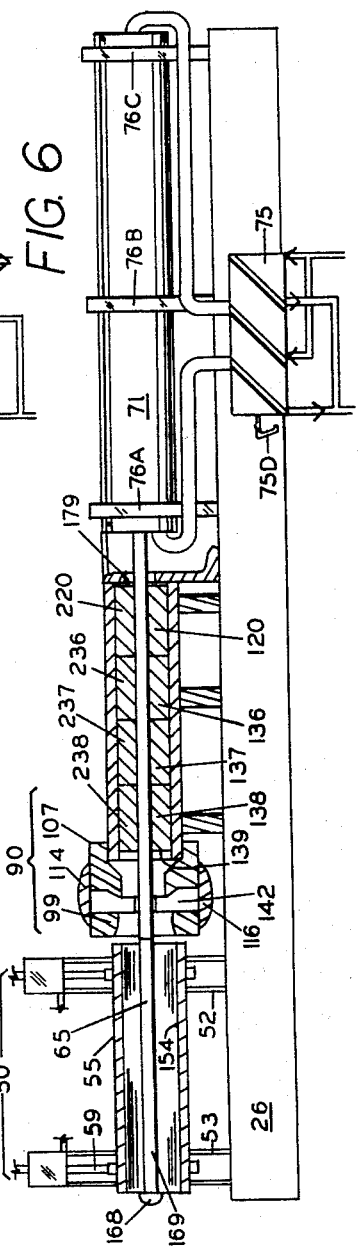

The alignment assembly 50 comprises a pair of spaced apart vertical towers 52 and 53 which are arranged to support and to move vertically a carrier tube 55 in FIGURES 1, 5, and 6. The alignment assembly 50 comprises vertical towers 52 and 53, carrier tube 55, hydraulic piston chambers 56 and 57, hydraulic piston shafts 58 and 59 therein and a liner draw rod 65, hydraulic power source 150 and valve 152. The towers 52 and 53 are firmly attached to and supported on top of I-beam 26. Tower 52 comprises a rigid front right vertical slide frame member 62 and a rigid front left slide member 63 and vertical hydraulic piston chamber 56 firmly attached to the tops thereof. A reciprocatable piston shaft 58 extends downward from the bottom of the piston chamber 56 and is attached to and supports front carrier tube clamp 60. Clamp 60 slides vertically in members 62 and 63. The rear tower 53 is provided at its top with an identically sized chamber 57 (i.e. same diameter, same length chamber) as 56, and extensible and retractable piston shaft 59 extended downwardly therefrom, which is operatively connected to the rear tubing clamp 61. The clamps 60 and 61 are rigid elements which slide in grooves therefor in the vertical frame elements, as 62 and 63 within the front element 52. Each clamp, 60 and 61, is firmly attached to and supports a carrier tube end portion.

Carrier tube 55 is a hollow rigid cylindrical steel horizontally extending tube with a length adequate to support therein the entire series of liner elements which are intended to be put into the pipe 81. The interior diameter of the tube 55 is slightly larger than the interior diameter of the tube 81 to be lined so that the liner elements such as 120, 220, 136, 236, 137, 237, 138 and 238 to be put into the tube 81 may fit freely into the interior of the tube 55. The tubing clamps 60 and 61 are provided with bushings such as 67 and 68 for different sizes of tube as 55 for correspondingly different sizes of pipe to be used for the apparatus 81. Carrier tube 55 is supported by clamps 60 and 61 so that in its lowered position—shown in FIGURES 3, 4, 5, 6, 8 and 10, it is co-axial with the axis of shaft 72 and the bushings in supports 23, 24 and 25. The discharge end, 155, of tube 55 is supported by and near to clamp 60; the base or rear end 156 of tube 55 is supported by and near to clamp 61. A hydraulic power source 150, hydraulic power reservoir 151, hydraulic alignment control valve housing assembly 152 and valve control handle 153 and power lines 158 and 159 are operatively connected in conventional manner, diagrammatically shown in FIGURES 1–3, to raise and lower the tube 55. Power source 150 is operatively connected by lines 158 and 159 to piston chambers 56 and 57 and thereby moves both ends of tube 55 up and down together.

The draw rod shaft 65 is chosen to have an external diameter about 1/32 inch smaller diameter than the diameter of the interior surface as 121 and 221 of the representative lining elements such as 120 and 220 (as well as 136, 236, 137, 237, 138, 238) fed into the to-be-lined pipe 81. For this purpose a variety of sizes of rod 65 for handling of liner elements as 120 and 122 of different internal diameter (as 121 and 221) is needed. For this purpose several spare draw rods as 65A, 65B, 65C are stored where they are readily available between the towers 52 and 53.

The liner draw rod shaft 65 has a male thread 16 at its front end 166 which joins a matching female thread carried by the free end 167 of shaft 72 (FIGURES 3–7).

The shaft 65 rear or base end 169 has an enlarged end plate 168, cylindrical in shape and co-axial with 65 and firmly attached thereto; that plate has a larger diameter than the orifice formed by surfaces as 121 and 221 of elements as 120 and 220 but a smaller internal diameter than the internal diameter of tube 55.

Assembly 70 comprises, in operative connection, a hydraulic piston chamber cylinder 71, a piston shaft 72, cylinder supports 76A, 76B, 76C, positioning plate 77, strut 78, and a hydraulic control and power sub-assembly 79 for controllably driving the piston and its shaft.

Chamber cylinder 71 is a rigid 22 feet long hollow cylinder attached to and firmly supported by rigid supports 76A, 76B and 76C on I-beam 26 which keep the cylinder 71 with its longitudinal axis parallel to a flat vertical plane passing through the center of the I-beam 26 and parallel to the top thereof. Additionally, the L-shaped positioning plate member 77, built of sturdy steel plate, is firmly attached to the top surface of the plate 26 and extends upwards therefrom.

Piston shaft 72 is a rigid solid cylindrical steel shaft fixed to piston 72A; piston 72A is slidably located in chamber cylinder 71. Piston shaft 72 is designed to have such a length as to move all the liner elements (as 120, 220, 136, 236, 137, 237, 138 and 238) to be located in tube 81 from their initial serial and adjacent positions in tube 55 into serial and adjacent positions in pipe 81 and across the space between tube 55 and pipe 81. Accordingly shaft 72 has a length equal to the length of the series of elements as 120, 136, 137, 138 and 220, 236, 237 and 238 plus the length of the distance between the discharge end 155 of carrier tube 55 and the inlet end, 86, of tube 81 plus the distance inward of that end whereat the outer end of the last of the series of liner elements is located (e.g. end 139 of element 138). The chamber cylinder 71 is slightly longer than the travel required of shaft 72. Shaft 72 is operatively connected to piston 72A which travels in chamber cylinder 71.

The hydraulic control and power sub-assembly 79 comprises hydraulic lines 73, 74, 75A, 75B, hydraulic control valve 75, and a hydraulic fluid reservoir 79A. An input hydraulic line 75A and output hydraulic line 75B and fluid control valve 75D are operatively connected to valve 75 and to the ends of the chamber cylinder 71; lines 74 and 73 connect the reversible flow valve 75 to a reservoir source of hydraulic fluid 79A and to a pump 79B therefor. Valve 75 has a central handle 75D.

The positioning plate 77 is a rigid sturdy L-shaped steel brace; it has a vertical flat plate portion 177 that extends vertically upward from the top of beam 26 and a horizontal flat base portion 178 that is firmly attached to the top of beam 26 and firmly attached to and supports the bottom of portion 177. The left (as seen in FIGURES 1–6) flat face of portion 177 is perpendicular to the longitudinal axis of chamber cylinder 71 and extends to the same height as the top of that chamber cylinder. The vertical portion 177 has a circular hole 179 therethrough; hole 179 is cylindrical and has a horizontal axis and is concentric with the central longitudinal axis of the cylindrical piston shaft 72, which extends therethrough as shown in FIGURES 3–6. Hole 179 has a radius slightly larger than the diameter of shaft 72 and substantially smaller than the external diameter of pipe 81; thereby the shaft 72 passes freely therethrough (as shown in FIGURES 4 and 5).

The vertical portion 177 of plate 77 provides for seating the base end, 80, of tube 81. Thereby the positioning plate 77 serves to resist the force of the piston 72A and shaft 72 against the pipe 81. This is shown by the change in relations shown in FIGURE 3 and FIGURE 4. In FIGURE 3 the base 80 of tube 81 is slightly spaced away from the support plate 77 while in the stages of operation of the apparatus as shown in FIGURES 4, 5, and 6, the base 80 of pipe 81 is located directly against the left face (as seen in FIGURES 3–6) of the plate 177 and is firmly pressed and located against plate 177. Additionally, a rigid strut 78 attached to the top of plate 177 and to the top of cylinder 71 serves to transmit load from the top of plate 177 to the cylinder wall 71 and thence by the supports 76A, 76B and 76C to beam 26.

Each pipe as 81 is a standard steel cylindrical pipe as used for water wells. When empty, i.e., without a liner, it is located in position as shown for pipes 82A, 82B and 82C on rails 27 and 28 on the empty pipe feed subassembly 22. After being loaded with liner elements, as shown in FIGURE 6, the pipe is moved to and located in position shown for the lined pipes 83A, 83B and 83C. Pipe 81 has an inner concave cylindrical smooth surface 84 surrounding a cylindrical cavity 88 and a co-axial cylindrical outer convex surface 85, a left (as seen in FIGURES 1–6) or feed end 86 and a right (as seen in FIGURES 1–6) or base end 80.

The blade sub-assembly 90 comprises, in cooperative combination, a blade element 91, a sleeve 107, a throttle ring, 99, and a spacer and connector sub-assembly 114 (see FIGURE 6).

Blade element 91 is a rigid steel annular element elongated in the direction of its longitudinal axis. It has (see FIGURE 7) a convex smooth cylindrical outer surface 94, a transversely flattened rear or base end 95, an interiorly concave conical smooth surface 97 extending forwardly from the base or rear end 95, and a cylindrical concave smooth surface 92A, forwardly of 97 and an outer conical surface 96. Surfaces 97 and 92A meet at ring 92. Surface 92A meets outwardly convex conical surface 96 at smooth circular cutting edge 93. Surfaces 92A, 94, 97 and 96 and edge 93 are concentric.

Sleeve 107 is a rigid steel tube with an interior concave surface 108, and an exterior convex surface 109, a front flat edge 110 and a rear or base flat edge 111. Interior surface 108 is chosen to have an interior diameter sufficiently close to exterior surface 85 of pipe 81 to provide a smooth yet removably slidable fit thereover, i.e., it has a sufficiently substantially same inner diameter as the outer diameter (i.e., diameter of outer surface 85) of the pipe 81 to form a smooth, not a loose, sliding fit thereover, this is usually a fit of +0.010″±.005″. Sleeve 107 has an internal transverse groove 112 open to surface 108: a compressed C-shaped snap ring 113 therein engages pipe end 86 and locates sleeve 108 on pipe 81. Ring 113 has an external diameter less than the diameter of surface 109 and an internal diameter no less than does surface 84 of pipe 81 yet less than the diameter of surface 85 of pipe 81, and no less than the internal diameter of base 95 of blade element 91. This permits removal of blade element 91 for sharpening and re-insertion in sleeve 107 (from its end 111) at proper position, as determined by the ring 113, on 81.

Surface 94 of blade sub-assembly 90 is smoothly and firmly but removably fitted to surface 108 of sleeve 107. The rearward projection of the conical surface 96, away from cutting edge 93, does not intersect the surface 109 or face 110 of sleeve 107.

Throttle ring 99 is generally a rigid sturdy thick steel annulus; it has a flat front feed face 100, a flat rear face 101, a convex cylindrical outer surface 103, and a smooth concave tapered hornlike conical interior surface 102 coaxial with surface 103. Surface 102 is tapered from its junction with the feed face 100 to its junction with the rear face 101 and is formed by rotation about a central axis of a curved smooth line asymptotic to a line parallel to but radially spaced away from that central axis; that line (shown as 105 in FIGURE 7) intersects the rear face 101 substantially perpendicularly.

The curved surface 102 forms a large acute angle with the plane of face 100 at the circular opening 106 formed and outlined by the junction of surface 102 and face 100 of ring 99. That acute angle is open to the central axis for surface 102. The opening 106 has a greater diameter than the opening 104, formed by the intersection of rear 102 with surface 101. The surfaces 102 and 103 are concentric with surfaces 94, 96, 97, 108 and 109. The distance of the line 105 from the central axis of surface 102 is slightly greater than the radius of the circular cutting edge 93.

The front or cutting edge 93 of blade 91 is spaced away longitudinally from the rear face 101 and orifice 104 of ring 99 by a cuttings discharge gap 119.

Connector assembly 114 comprises a plurality of radially spaced apart concentrically arranged longitudinally coextensive like rigid sturdy elongated elements, each attached firmly at its rear or base end to the outer surface of sleeve 107 and each firmly attached at its front or feed end to the outer surface of ring 99; assembly 114 comprises a top element 115, a bottom element 116, a first side element 117, and a second side element 118. There is a discharge orifice 141 between elements 115 and 117, orifice 142 between elements 116 and 117, orifice 143 between elements 116 and 118 and orifice 144 between elements 115 and 118. The cross sectional area of each of these orifices, as 142, as seen in transverse cross-section is greater than the cross-sectional area of the elements adjacent thereto as 116 and 117 to provide for free escape through such orifices of the cuttings formed in the process of operation of the apparatus 20. Connector assembly 114 supports ring 99 in fixed yet spaced apart relation to sleeve 107 and edge 93 of blade 91. In the operation of apparatus 20 herein described, each wooden liner element as 120 which is handled by that apparatus is an elongated solid wooden polygon. It has an inner concave cylindrical surface 121 and outer hexagonal surface with flat, face, longitudinally extending portions 123, 124, 125, 126, 127 separated, respectively by longitudinally extending edges thereof, 128, 129, 130, 131, respectively as shown in FIGURE 9. FIGURE 9 is a full scale drawing of each of elements as 120 and 122 (which are three feet long) as seen in the direction of 9A of FIGURE 2 in the operative embodiment of the apparatus 20 herein referred to. The element 120 is generally C-shaped and has a right upper face 132 and a left upper face 133 and a rear flat end 134 and a front flat end 135. Other like liner elements as 136, 137 and 138 are, with element 120, loaded into the empty tube 55 for insertion into 81 as herebelow described.

The wood used is a California redwood with the grain thereof parallel to the length of the piece. Additional data are given in Table I herebelow. The liner elements are placed in a bath with a saturated hydro-carbon hydraulic oil. Two thousand feet of bearing element (such as 120) at a time are brought to 180° F. in a bath of such oil for about 10 minutes. Thereafter, cooling the wood in the bath results in that the wood absorbs 100 gallons of such oil per 1000 feet of bearing, "bearing" length being the length of a pair of elements as 120 and 220. The overall combination of apparatus inclusive of apparatus 20 for the process of the invention comprises also a conventional covered container 160 for containing heated oil and the wood bearing liners as 120 and 220 for insertion into pipe, as 81. A fuel source 161 and an oil heater, 162, and pump 161A, and heater controller 162A provided for heating the oil in a safe manner to an elevated temperature below its boiling point and passing the heated oil into the container. The container 160 is operatively connected to apparatus 20 by a transport means as a conveyor belt 163 for elements as 120 and 220. The conveyor extends to a work platform 164 for support of elements as 120 prior to their insertion into carrier tube 55. A thermostat 162B controls heater controller 162A.

In operation each pipe to be loaded such as 82A, 82B, 82C is located on the rails 27 and 28 of the empty pipe feed assembly 22. The latches 29 and 30 hold the reserve pipes as 82A, 82B, 82C in position and provide for release of one pipe at a time. The released pipe rolls one at a time down the incline provided by rails 27 and 28 and the pipe is seated in the supports 23, 24 and 25. The bushes (as 36 in pipe support 23 and the bush 37 in pipe support 24) provide for a close fit of that bush to the pipe. For different size pipe different size bushes are used, all of which bushes fit into the upwardly open seat on each support as 23 and 24. These bushes are held in place by set screws as 37A and 37B, for 37.

Inasmuch as the carrier tube front or discharge end 155 is closer to the feed end 100 of the blade sub-assembly 90 than the lengths of any liner element such as 120, the carrier tube 55 is raised to a position so that the insertion of the liner elements into the tube 55 may be accomplished without interference therewith by the tube 81 or the subassembly 90 carried thereon, as shown in FIGURE 2.

The carrier tube 55 is raised to a position as shown in FIGURE 2 by actuation of the hydraulic fluid from reservoir 151 by motor 150 and, via handle 153, through valve housing 152 and hydraulic lines, as 158 and 159 into cylinders 56 and 57 and thus forcing shafts 58 and 59 upwards, and raising carrier tube 55 so that the lowest point, 154 of the interior surface thereof is above the top surface of the tube 81 and assembly 90.

A first pair of semi-circular liner elements as 138 and 238 are then formed into a circle as shown for elements 120 and 220 in FIGURE 9 thereby forming a circle which fits smoothly but loosely over the shaft 65. Each pair of elements such as 138 and 238, 137 and 237, 136 and 236, 120 and 220 are then pushed to the rear of the shaft 65 within tube 55. Six pairs of three foot long elements are used for a 20 foot long pipe 81, in an end-to-end series of such pairs.

As shown in FIGURE 2 the length of the shaft 65 is such as to extend from the rearmost of the liner elements (as diagrammatically shown by 138 in FIGURE 2) to be located in the liner tube 81 to the front face, as 135, of a front element, as 120, and still leave a small projecting portion, 166, with a male thread 165 thereon to engage the female thread at the free end 167 of the shaft 72.

The loaded carrier tube comprises the pipe, 55, with a plurality of pairs of elongated liner elements, as pair 120 and 220, 136 and 236, pair 137 and 237, pair 138 and 238 therein; each element of each pair is of the same length and cross-sectional shape as it is put into the carrier tube 55. All elements of all the pairs have the same cross-sectional shape as viewed transverse to the longitudinal axis of tube 55 and shown in FIGURE 9. As viewed in such transverse end view, each of the pairs and each of the elements of the pairs are of same shape and size; the top elements such as 220, 236, 237 and 238 of each pair are located with their flat faces, as 132 and 133, of element 120 horizontal; this permits that any irregularity of length will not cause one element, as 238, longer than the rest of such elements to receive a disproportionate stress during the operation of shaft 65, below described, forcefully moving the liner elements past cutter assembly 90 and into pipe 81.

Referring to FIGURE 9, the corner-to-corner diameter of the pair of elements 120 and 220 extends from a corner or edge as 130 to a corner or edge as 230 diametrically across the central longitudinal axis of tube 55; the chordal diameter of the pair of elements 120 and 220 extends from one flat face, as 125, to the flat face, as 225, opposite thereto (or across therefrom) along a diameter passing through the longitudinal axis of shaft 65. The chordal diameter of each pair of elements as 120 and 220 is less than the diameter of the throttle ring cutting edge 93 and is less than the distance across the circular opening 104 at the rear face 101 of throttle ring 99. The corner-to-corner diameter of the liner elements as 120 and 220 is greater than the diameter of the circular opening 104 at the rear face 101 of throttle ring 99 and less than the diameter of the circular opening 106 outlined by the intersection of front throttle ring surface 100 and its interior hornlike surface 102. This corner-to-corner diameter is also referred to herein as the major diameter of the liner element pair and the chordal diameter is herein below referred to as the minor diameter of the liner element pair. The internal diameter of tube 55 is chosen to be +.020"±0.010" greater than the major diameter of the liner element pair placed therein. For this purpose clamps 60 and 61 provide for replacement of the tube 55 for different sizes of liner elements. Prior to lowering of the thus loaded tube 55, the blade assembly 90 is located on the feed end 86 (as in FIGURE 6) of pipe 81. The assembly 90 is chosen so that the interior surface 108 of the sleeve 107 thereof firmly fits over the outside surface 85 of the pipe 81 to be lined while held in supports 23, 24, 25 and by plate 77. The carrier tube hydraulic source pump 150 and valve 152 and handle are actuated to and do direct the carrier tube 55 and the liner elements therein to a position as in FIGURE 3 wherein the axis of shaft 65 is co-axial with the shaft 72.

The assembly 70 is then energized through its hydraulic control valve 75 and the hydraulic elements as 79B, 79A shown in FIGURE 1 drive end 167 of the shaft 72 through the hole 179 in the plate 77 and through the orifices of the throttle ring 99 of the blade sub-assembly 90 and then, as shown in FIGURE 3, end 167 of the shaft 72 is joined to the threaded end 166 of shaft 65, which shaft is then a part of the loaded carrier tube as above described.

Then the control valve handle 75D is adjusted to apply hydraulic fluid to piston body 72A to drive the piston shaft 72 toward the right hand (as shown in FIGURE 3) end of the chamber 71 as shown in FIGURE 4. This motion causes the shaft 65 to follow the shaft 72 and button 168 engages the series of liner elements and urges them toward the cutter blade sub-assembly 90 as shown in FIGURE 4. The front edge 135 and 235 of the liner elements 120 and 220 enters orifice 106 and then engages the surface 102 of the throttle ring sub-assembly 90 while each of those elements is still firmly held by the front edge 155 of the carrier tube 55 as shown in FIGURE 4; the carrier tube 55 also holds one end of each such element in alignment as it passes into its initial contact with the cutter blade edge 93. Each of the successive pairs of elements such as 120 and 220, 136 and 236, 137 and 237, 138 and 238 of the end-to-end series of (or group of serially adjacent) pairs of oil-impregnated wooden liner elements thus moved from tube 55 into pipe 81 is firmly held by the front end of the carrier tube when that pair of elements first engages the throttle ring 99 and while that pair first contacts the front edge 93 of the cutter blade.

The throttle ring interior surface 102 successively compresses each of the corner-to-corner diameters of each pair of liner elements as each such pair of elements passes therethrough to a maximum diameter equal to the minimum diameter at the throat orifice 104 at face 101. The throttle ring surface 102 contacts only the edges as 128, 129, 130, 131, 228, 229, 230, and 231—accordingly, concomitant with movement of each element as 120 and 220 from orifice 106 to orifice 104 of ring 99, on the longitudinal motion of the liners past surface 102, there is developed centrally of the edges, as 230 and 231 (i.e. along a radially extending line) central of each such edge, as along the line 190 as shown in FIGURE 11A and line 191, a reduction of concave curvature and reduction of internal diameter of the formerly uniformly concave cylindrical surface as 221, as the portions thereof, as 192 and 193 (adjacent lines 190 and 191 respectively) are moved inward to a less concave shape and of lesser internal diameter than those portions had in the condition of the liner prior to the exertion of the force thereon, such as shown in FIGURE 11A. Also, formerly flat peripheral portions, as 226 (and 124) between adjacent compressed edges as 230 and 231 (and 128 and 129 respectively) are forced to a convex shape. In this bent condition of each element as 120 its leading face 135 is forced into contact with the blade 93 as diagrammatically shown in FIGURE 4. The blade 93 cuts into the most radially projecting, although compressed, edges 128, 129, 130 and 131 and removes the most lateral portion thereof; such cut off portions are discharged through the orifices 141, 142, 143, 144. This removal of the wood from the liner elements as 120 and 220 thus achieves a cutting of such elements while the liner element is forcefully compressed.

The compression and concomitant heating of the liner element is sufficiently sharp and large to cause expression of oil from the body of the liner element to the exterior surface thereof. The movement of the liner elements through the tube 81 is sufficiently rapid to effect location of the liner in the pipe 81 before the surface of the liner is sufficiently cool to lose the lubricating effect of the oil expressed from the wood to its surface by the heating effect applied to each liner element on passage through ring 99 and blade 91. Movement of the liner through the chamber 88 is thus, so rapid as to permit incomplete relief of the strain put on the wood liner by the throttle ring surface 102 and by the cutting blade until after the liner elements are brought to their finally desired location in pipe 81.

Following the location of the liner elements in their intended position in pipe 81 as shown in FIGURE 5 the hydraulic control assembly 75 thereof is reversed (by its handle 75D, as shown in FIGURE 6) and the piston 72A and shaft 72 driven toward assembly 50. Thereby, as shown in FIGURE 6, end 167 of the shaft 72 extends again into the space between the inlet orifice 106 of the blade sub-assembly 90 and end 155 of tube 55; in that position the end 167 of shaft 72 and end 165 of the shaft 65 are separated from each other.

Then handle 75D is reversed, assembly 79 activated and the shaft 72 is driven by the sub-assembly 79 to the contracted position of the piston shaft 72 in cylinder 71 as shown in FIGURE 1. Following that withdrawal of shaft 72 from the interior of that lined pipe 81 as above described, sub-assembly 90 is removed from end 86 of pipe 81, and the completed lined pipe 81 remains on supports 23, 24 and 25.

Then shaft 42 is rotated by actuation of link 48, which is actuated in turn by a hydraulic piston 49 and controlled by a conventional hydraulic control valve 149.

The rigid cupped arms 41 and 42 of the sub-assembly 40, attached to the control shaft 42, lift the lined pipe 81 which, thus raised at both of its ends, rolls down arms 41 and 43 and along the rails 44 and 45 and is collected, together with other lined pipes, such as 83A, 83B, 83C, at the discharge end of rails 44 and 45 of the sub-assembly 40.

This movement of shaft 72 and disconnection thereof from shaft 65 places the shaft 65 and tube 55 again in condition wherein they can, after raising to the position thereof shown in FIGURE 2, accept further liner elements for subsequent injection thereof by assembly 70 into a subsequently located pipe as 82A in the position heretofore shown for the pipe 81 in FIGURE 1 and repetition of the cycle above described for pipe 81. Thus, each of a series of pipes as 81, 82A, 82B, 82C is rapidly and reliably lined by liner elements as 120, 220, 136, 236, 137, 237, 138 and 238 as an end-to-end series of adjacent pairs of such elements.

Accordingly the product of the process of operation of apparatus 20 is a steel pipe or sleeve, such as 81, wherein a plurality of oil-impregnated wooden liner elements are firmly located.

The wood lined bearing thus produced comprises essentially an end-to-end series of adjacent pairs of liner elements as 120 and 220 in a sleeve therefore, as pipe 81. There are six such pairs in such end-to-end series, each element of each pair being three feet long for a twenty foot long pipe; not just four such pairs as diagrammatically shown in FIGURES 2-6. Each of these liner elements is generally octagonal in transverse cross-sectional view with the apices of the polygon (as 128 and 129 and 130 and 131) cut off, and these cut off apices forming seating areas as 129A–129B with the same radius of curvature as the circular cutting edge 93 of assembly 90 and such seating areas firmly seated on the interior surface 84 of the pipe 81. The generally flat surfaces as 124 in FIGURE 11B between these areas contacting the sleeve or pipe 83 are, being under compression, slightly convex and the portions as 328, 329, 330 and 331 of the interior surface in radial line with the former apices are slightly but definitely displaced inward relative to the portions of the liner radially in line with the former chordal portions—e.g. portions 324, 325 and 326 respectively in line with chordal portions 124, 125 and 126. Notwithstanding this waviness (exaggerated in the drawing for purposes of illustration) the interior bearing surface of the finished product is smooth to the hand and eye and has no observable cracks or roughness. The diameter of shaft 65 is such that it does not interfere with the above described reduction of internal diameter of elements as 120 and 220 yet does center and contact and support the interior surfaces as 121 and 221, during the passage of elements as 120 while in contact with blade 93, relative to blade 93 and surface 84. The slight waviness does not crack the wooden liner elements as 120, 220, 137, 237, 138 and 238 and does provide that the points of minimum internal diameter, as 330 and 331 serve to bear the load of contact of a shaft as 365 and avoid that such shaft (365) bear against a weaker area of the liner, such as 326 (as such area 326 is dependent for its support on a bridged backing i.e. the surface 326 being supported between the contact areas 130A–130B and 131A–131B), the structure provided by the process of this invention avoids a development of cracks in the wooden liner element and does place the load to be borne by the bearing on the most solid and most directly supported liner portions, as 329 (supported directly by seat portion 129A–129B) and like portions 328 and 330.

As the process and apparatus 20 provide a centering means 65 for the whole length of all the liner elements, performed in one smooth stroke, taking only 10 seconds for a 20 foot continuous travel of shaft 65. To make more specific the above description of the apparatus 20, its product and its operation, quantitative aspects are set out below in Tables I and II.

Generally the orifice 104 diameter is .03–.06 inch less than the major or corner-to-corner diameter (e.g. 130–230 in FIGURE 9) of the pair of liner elements as fed into assembly 90: edge 63 diameter is .010 inch less than the internal diameter 84 of the pipe 81.

Another embodiment using a water insoluble plastic, a plastic that is not subject to cracking as is wood due to its grain, is shown in FIGURE 11D. Therein, a preformed extruded shape 183 with an outline as shown in FIGURE 11D is used; the lined bearing therein shown comprises a radially compressed hollow polygonal liner 183 within a hollow metal sleeve therefor 181 the sleeve having a cylindrical interior surface 184, the liner is, like that shown in FIGURE 6, formed by a longitudinally extending series of adjacent longitudinally elongated elements each having a polygonal cross section with a plane of symmetry passing through a major diameter thereof. The polygonal cross-section of 183 has truncated apices 185, 186; said truncated apices forcefully bear against the interior surface 184 of the sleeve 181. The faces 187, 188, 189 of the polygonal elements between the apices are spaced away from the interior surface of the sleeve; element 183 is formed of nylon, a water-insoluble resilient plastic. Each of a plurality of said elements has an interior surface 182 that is smooth and generally cylindrical with an undulating outline. The interior surface 182 shows a maximum internal diameter centrally of said truncated apices as at 174 and a minimum internal diameter as at 175 and 176 centrally of said polygonal faces, however, the interior surface of the liner 183, like that of FIGURES 11B and 11C, is symmetrical about a longitudinal axis co-axial with the interior surface of said sleeve and resilient.

The oil used in container 160 is one that does not emulsify e.g. has a steam emulsion, A.S.T.M. method, of below 600, is neutral (has a low neutralization number), and no sediment; an oil of following specification is exemplary therefor: Baume gravity (A.P.I.) at 60° F., 26–31; flash point in Cleveland open cup, ° F., 380; Fire point in Cleveland open cup, ° F., 430; Neutralization number 0–0.02 mg. per KOH per gram; seconds, viscosity S.U.V. at 100° F., 145–155; seconds viscosity S.U.V. at 210° F., 42–44; demulsibility number, 1620 at 130°. Herschel or 30–60 steam-emulsion number.

Figure 7:
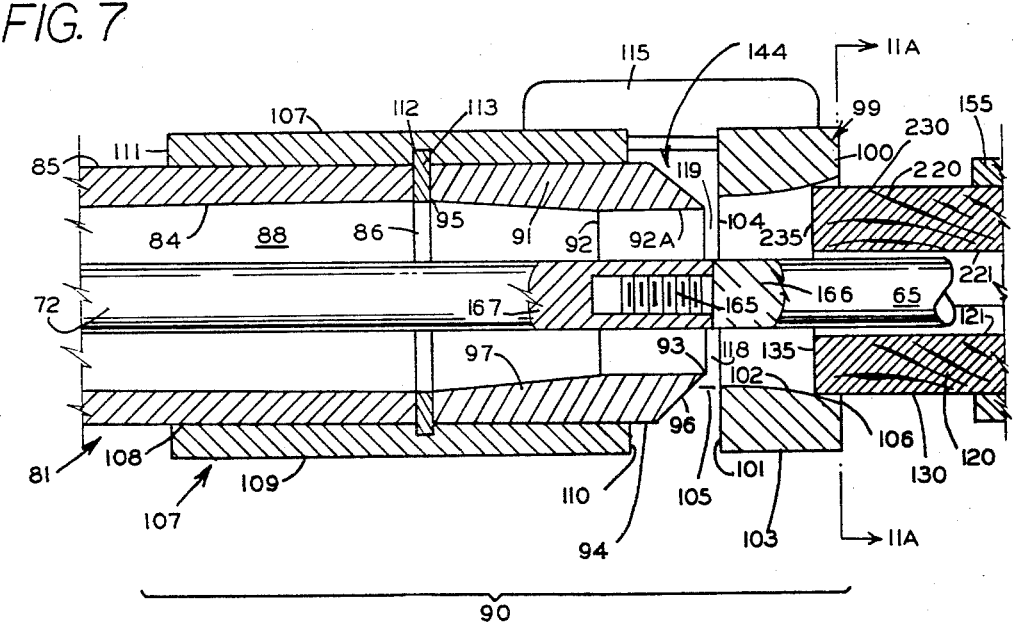
FIGURE 7 is an enlarged sloped diametral longitudinal-sectional view of zone 7A of FIGURE 3 along plane 7B—7B of FIGURE 9 and prior to the stage shown in FIGURE 4.
Figure 8:
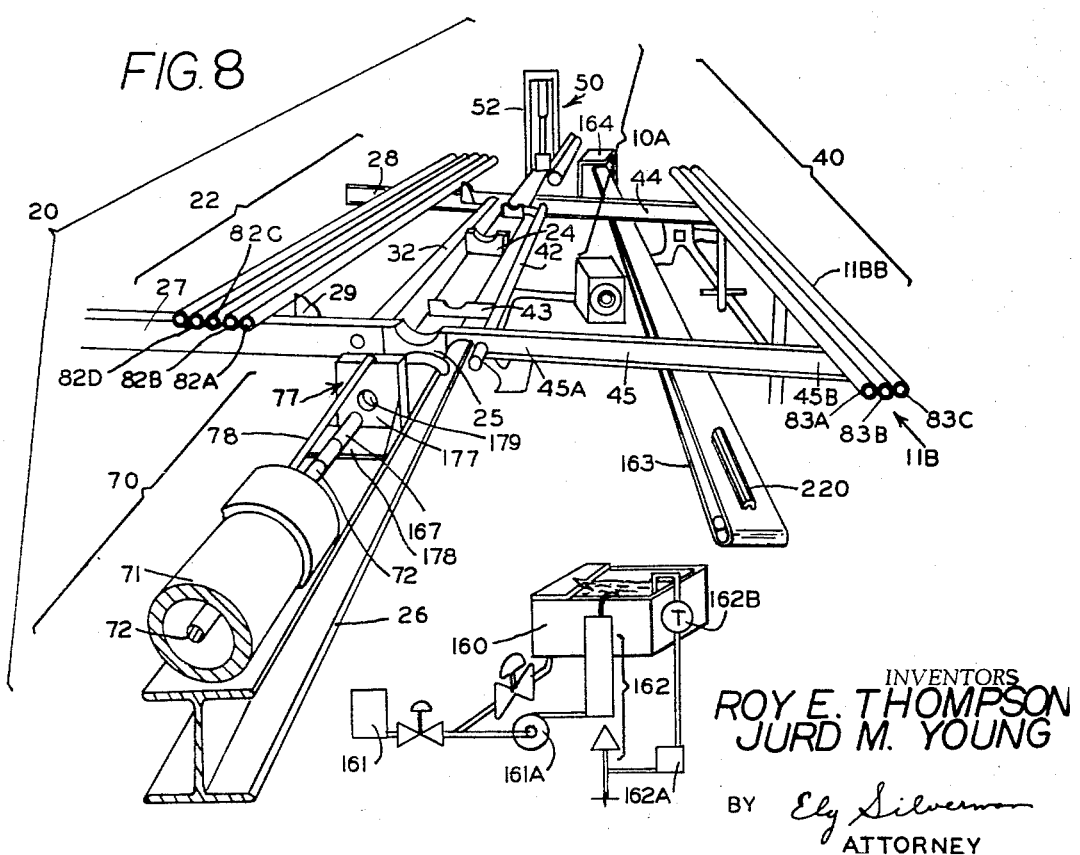
FIGURE 8 is a diagrammatic perspective view of the apparatus 20 as seen along the direction of arrow 8A of FIGURE 1 but with pipe 81 removed.

The quadrant of element 183 is exemplary of three other like quadrants in the same manner that the quadrant in FIGURE 11A is exemplary of the full liner shown in FIGURE 7 and the quadrant of FIGURE 11B is exemplary of a full liner of such as in FIGURE 8. The dotted line 366 shown in FIGURE 11D shows the position of the periphery of a shaft such as 365 in relation to a liner bearing including that plastic liner element.

TABLE I.—FIXED MEASUREMENTS AND DIMENSIONS OF APPARATUS 20

| Item | Ref. No. | Dimension or measurement |
| --- | --- | --- |
| Shaft | 72 | 1½″ o.d. |
| Chamber 71, pressure from Pump 79 | 71, 79 | 1,000 p.s.i. |
| Chamber 71, i.d | 71 | 2⅛ in. |
| Wall thickness | 71 | ⅝ in. |
| Length | 71 | 22 feet. |
| Piston travel rate | 72 | 20 feet per 10 seconds. |
| Pipe 81, i.d | 84 | 2.067. |
| Pipe 81, o.d | 85 | 2.375±.10. |
| ASTM grade | | A120. |
| Length | | 20 ft. |
| Carrier tube length | 55 | 18 ft. |
| I-beam length | 26 | 65 ft. |

TABLE II.—MEASUREMENTS AND DIMENSIONS OF APPARATUS 20 SUBJECT TO VARIATION WITH VARYING SIZE OF LINER ELEMENTS AND SLEEVES

| Item | Ref. No. | Dimensions (inch) | | | |
|---|---|---|---|---|---|
| Pipe diameter, i.d. | 84 | 1.610 | 2.067 | 2.469 | 3.068 |
| Blade diameter (at cutting edge) | 93 | 1.600 | 2.060 | 2.460 | 3.062 |
| Blade length | 93-92 | 1¼ | 1⅜ | 1½ | 1¾ |
| Cap length | 111-110 | 6 | 6 | 6 | 6 |
| Cap, o.d. | 109 | 2⅜ | 2⅞ | 3⅜ | 4 |
| Throttle ring, i.d. minimum | 104 | 1.850 | 2.320 | 2.719 | 3.320 |
| Throttle ring length | 101-102 | 1½ | 1½ | 1½ | 1½ |
| Throttle ring, maximum i.d. | 106 | 2.00 | 2.375 | 3.00 | 350 |
| Edge-ring distance | 93-104 | ¼ | ¼ | ¼ | ¼ |
| Wood hex. diameter (maximum diameter) | 120-220 | 1.885 | 2.360 | 2.775 | 3.380 |
| Wood, i.d.: | 121 | | 1.250 | 1.500 | 1.812 |
| (a) | | | 1.312 | 1.562 | |
| (b) | | 1.125 | 1.625 | 3.062 | |
| (c) | | 1.375 | | 1.812 | |
| (d) | | | | | |
| Wood, weight per foot | | ¹3 | ¹.5 | ¹.6 | ¹.7 |
| Shaft diameter: | 65 | | 1.125 | 1.375 | 1.678 |
| (a) | | | 1.187 | 1.437 | |
| (b) | | | 1.1250 | 1.500 | 1.937 |
| (c) | | 1.000 | | 1.687 | |
| (d) | | | | | |
| Feed rate during operation | | ²2 | ²2 | ²2 | ²2 |

¹ Pound.
² Feet per second.

As shown by the data of Table II during the operations of apparatus 20 above described:

(a) The major diameter of each pair of liner elements as 120 and 220 is compressed and reduced in size by about 0.030 inch for a small size (1.610″ i.d.) pipe 81 in travel through ring 99 (the beginning of which travel is shown in FIGURE 11A); then (b) Edge 93 removes 0.25 ±.01 inch from the outer, major, diameter for a total outer diameter reduction of about 0.28 inches, of which only about .03 inch is an elastic or resilient reduction. The cutting forms a series of wide bearing surfaces at 129A–129B, and 130A–130B, where previously only a linear edge as 129 and 130 had existed. These bearing surfaces as 129A–129B, 130A–130B, are broad truncated apices (or apexes) each about ½″ wide where previously a linear edge had existed: after such cutting or compressed apices, (c) As the internal diameter of surface 84 or pipe 81 is 0.010 inch to 0.006 inch larger than the cutting edge diameter, the final maximum diameter of each pair of lines, as 120 and 220, or the pipe 81, as shown in FIGURES 11B and 11C is reduced by 0.25 inch, with a resilient compression of about .020 inch ±.005 inch and (d) The internal diameter of surfaces as 121 and 221 across radii as 190 and 191 is reduced a maximum, as at interior surface portions 328, 329, and 330 of 0.02 inch ±.005 inch: accordingly the shaft of rod 65, which has an external diameter smaller by 0.100 to 0.140 inch than the initial internal diameter of the liner pair (diameter between surfaces 121 and 221, as shown in FIGURES 7 and 9) does not interfere with the above described limited but definite reduction in interior surface (121 and 221) of the pairs of liner elements; however the close yet slidable fit of the exterior surface of shaft 65 to internal liner surfaces as 120 and 121 and the fit of the outer liner surfaces, as 129A–129B, 130A–130B with surface 84 of pipe 81 provides definite and positive support and alignment of each of the series of the liner elements relative to surface 84 in the movement of those elements through the cavity 88. This relation of shaft and liner elements prevents serious canting of each of such end-to-end series of elements and avoids jamming of any of such elements against the surface 84 during that travel and results in a smooth passage during that travel without development of tearing or breaking or splitting stresses in those liner elements notwithstanding the usual small variation in dimensions of length of such elements.

The wood used for the liner elements as 120, 220, etc. is heartwood of redwood (Sequoia sempervirens or Sequoia, coast redwood).

Although in accordance with the provision of the patent statutes, particular preferred embodiments of this invention have been described and the principles of the invention have been described in the best mode in which it is now contemplated applying such principles, it will be understood that the operations, constructions and compositions shown and described are merely illustrative and that my invention is not limited thereto and, accordingly, alterations and modifications which readily suggest themselves to persons skilled in the art without departing from the true spirit of the disclosure hereinabove are intended to be included in the scope of the annexed claims.

We claim:
1. Process of forming wood lined bearings comprising the steps of
   (a) longitudinally aligning each of a series of like elongated hollow wooden liners with transverse polygonal outlines,
   (b) compressing each liner along its major axis and, while said liner is compressed,
   (c) cutting the apices of the polygonal faces longitudinally and,
   (d) locating the thus compressed and cut liner elements into a sleeve element therefor.

2. Process as in claim 1 including also the step of supporting the interior of each of said liner elements and aligning each of said elements in said sleeve while moving said element longitudinally in said sleeve.

3. Process of forming wood lined bearings comprising the steps of impregnating with a hydro-carbon oil each member of a pair in each of a series of pairs of mirror-image symmetrical centrally hollowed wooden liner members, each of said liner pairs having a like uniform transverse polygonal outline with a like minimum diametral chordal diameter and a like maximum diametral apical diameter, locating each of said oil impregnated pairs of liner members in a series of pairs around a rigid support shaft, concurrently forwardly moving all said shaft and all of said series of oil impregnated liner elements longitudinally in first direction into and longitudinally within a sleeve therefor, said sleeve having an internal diameter lesser than the maximum, apical, diameter of said pair of liner elements and greater than the minimum, chordal, diameter thereof, while radially compressing each liner centrally along its apices and radially expanding the minimum chordal diameter thereof, performing said steps of radially compressing the apices and expanding the chordal diameters of the liners and longitudinally moving sequentially on each element of said series of pairs of liner elements, while continually aligning the most forward portion of each of said liner elements in said sleeve while moving said elements longitudinally into said sleeve, and expressing oil from said liners during the movement thereof through said sleeve.

4. Process as in claim 3 comprising also, during the time of the step of concurrently moving all of said series of liner elements longitudinally into a sleeve therefor after alignment thereof around said shaft, effecting that longitudinal movement while holding one end of each of said liner elements at one peripheral portion thereof while compressing each liner at another portion thereof along its major axis, said compression being a radial compression of each element along its exterior apices.

5. Process as in claim 3, said impregnation accomplished by heating said liner elements in an oil bath, said oil bath being a saturated hydro-carbon oil, the initial temperature of said bath at immersion of said wood therein being about 180° F., said wood being cooled in said bath after immersion therein and wherein the rate of travel of asid series of liners through said sleeve is about 2 feet per second and the length of said travel is about 20 feet.

6. Process as in claim 3, comprising also, during the time of the step of concurrently moving all of said series of liner elements longitudinally after alignment thereof, effecting that longitudinal movement while holding one end of each of said liner elements at one peripheral portion thereof while compressing each liner at another portion thereof along its major axis, said compression being a radial compression of each element only along its exterior apices, and continuing said holding while longitudinally cutting said apices and effecting said locating by longitudinally moving said compressed and cut elements into and longitudinally within said sleeve therefor, said sleeve having a lesser diameter than the initial major diameter of said pair of liner elements, and performing said steps of moving longitudinally, radially compressing and longitudinally cutting and moving sequentially on each element of said series and continuously on said series of liner elements.

7. A wood lined bearing comprising a radially compressed hollow polygonal liner within a hollow metal sleeve therefor, said sleeve having a cylindrical interior surface, said liner comprising a longitudinally extending series of adjacent longitudinally elongated elements each having a polygonal cross section with a plane of symmetry passing through a major diameter thereof, said polygonal cross-section having truncated apices, said truncated apices forcefully bearing against the interior surface of said sleeve, the faces of said polygonal elements between said apices being spaced away from said interior surface of said sleeve and said liner having a smooth interior surface.

8. Wood lined bearing as in claim 7 wherein said elements are formed of oil impregnated wood, each said wooden element has a grain and said grain is parallel to the length of said wooden element, each of a plurality of said elements has an interior surface and said interior surface is smooth and generally cylindrical with an undulating outline and said interior surface has a lesser internal diameter centrally of said truncated apices and a greater internal diameter centrally of said polygonal faces and wherein said interior surface of said liner is symmetrical about a longitudinal axis co-axial with the interior surface of said sleeve.

9. Wood lined bearing as in claim 7 wherein said elements are formed of water insoluble resilient plastic, each of a plurality of said elements has an interior surface and said interior surface is smooth and generally cylindrical with an undulating outline and said interior surface has a greater internal diameter centrally of said truncated apices and a lesser internal diameter centrally of said polygonal faces and wherein said interior surface of said liner is symmetrical about a longitudinal axis co-axial with the interior surface of said sleeve.

10. Apparatus for forming long wood lined bearings comprising, in operative combination, a frame assembly, a liner holding assembly, a sleeve support and feed assembly, and a liner drawing assembly and a lining element compressing and cutting assembly, (a) said frame assembly comprising a rigid frame means elongated in a first vertical flat plane and a plurality of cylindrical pipe seating means firmly supported on said frame means along said first vertical plane; pipe end engaging means in line with said pipe supports means on said frame means between said sleeve support means and said liner drawing means, (b) said liner holding assembly comprising a first axially symmetrical axially elongated hollow chamber, a first self-supporting shaft co-axial with said chamber and within said chamber, elevating means operatively attached to said chamber and holding said axially elongated hollow chamber in a firmly fixed position with its longitudinal axis in said first vertical flat plane, said plurality of cylindrical pipe seating means supported on said frame means being in a line co-axial with said axially elongated chamber;

(c) said sleeve support and feed assembly comprising a pipe feeding means operatively attached to said frame means for feeding each of a series of pipe into said pipe seating means, and a pipe discharge means located in part in line with said pipe seating means and in part extending to one side thereof; a sleeve located in said sleeve support and said lining compressing and cutting means removably supported thereon, said sleeve being co-axial with said first axially elongated hollow chamber, (d) said liner compressing and cutting means comprising a co-axial hollow longitudinally tapered compressing member and a cutting blade and a rigid spacing means therebetween and firmly attached thereto;

(e) said liner drawing assembly located on the other side of said sleeve from said liner holding assembly and spaced away therefrom and comprising a second shaft support and a rigid second shaft movably located in said second shaft support and in said first vertical plane in line with the axis of said pipe located in said pipe supports, said second shaft movable from a first position to a second position thereof, said second shaft in said first position extending through said pipe in said pipe supports to said first shaft in said first chamber and then extending to a space between said first chamber and said compressing means, and in said second position of said second shaft, said second shaft extending to a space between said pipe in said pipe supports and said support for said shaft, said second shaft support firmly located on said frame means, power means operatively and controllably attached to said second shaft in said liner drawing means to drive it to and from said first position thereof to said second position thereof.

11. Apparatus as in claim 10 wherein said compressing means is an annular longitudinally tapered ring with a circular inlet orifice and a circular outlet orifice and a hollow smooth curved surface therebetween, the cutting blade is a circular blade with a diameter less than the diameter of said outlet orifice, the edges of said orifices and of said cutting blades being co-axial and parallel, and said outlet orifice having a diameter less than the internal diameter of said first axially elongated hollow chamber.

References Cited
UNITED STATES PATENTS

| | | | |
|---|---|---|---|
| 1,176,303 | 3/1916 | Layman | 29—149.5 |
| 1,676,171 | 7/1928 | Valentine | 29—149.5 |
| 1,733,610 | 10/1929 | Leipert | 29—200 X |
| 1,961,536 | 6/1934 | Thiry | 29—149.5 |
| 2,110,783 | 3/1938 | Welker | 29—149.5 |
| 2,684,524 | 7/1954 | Beck | 29—235 |
| 2,796,659 | 6/1957 | Buske | 29—149.5 |

THOMAS H. EAGER, *Primary Examiner.*

U.S. Cl. X.R.

29—200, 235; 308—238